United States Patent

Koyama

[15] 3,661,244
[45] May 9, 1972

[54] AUTOMATIC CIRCULAR WINDING AND RELEASING BELT CONVEYOR

[72] Inventor: Masaaki Koyama, No. 2265-20, Kawashimacho, Hodogaya-ku, Yokohama, Japan

[22] Filed: Apr. 18, 1969

[21] Appl. No.: 817,388

[30] Foreign Application Priority Data

June 28, 1968 Japan..................................43/44683

[52] U.S. Cl............................................................198/184
[51] Int. Cl..........................................................B65g 15/08
[58] Field of Search..........................................198/184, 193

[56] References Cited

UNITED STATES PATENTS

| | | | |
|---|---|---|---|
| 2,310,819 | 2/1943 | Orden | 198/193 |
| 3,224,566 | 12/1965 | Elliott | 198/193 |
| 3,421,613 | 1/1969 | Sadek | 198/184 |
| 3,429,422 | 2/1969 | Yoshimura | 198/184 |

*Primary Examiner*—Edward A. Sroka
*Attorney*—Wenderoth, Lind & Ponack

[57] ABSTRACT

A belt conveyor or the like carries the object to be forwarded on the belt surface by means of a mechanically operated pulley provided with an electric motor as a motive power. The belt conveyor prevents scattering of lightweight powder or grains due to wind at the time of their conveyance, and at the same time, it prevents water leakage due to rain and snow, and also enables a steep slope conveyance as well as an entirely new and progressive plane detour wherein the belt automatically takes the form of a cylinder as to envelop the object to be carried.

1 Claim, 17 Drawing Figures

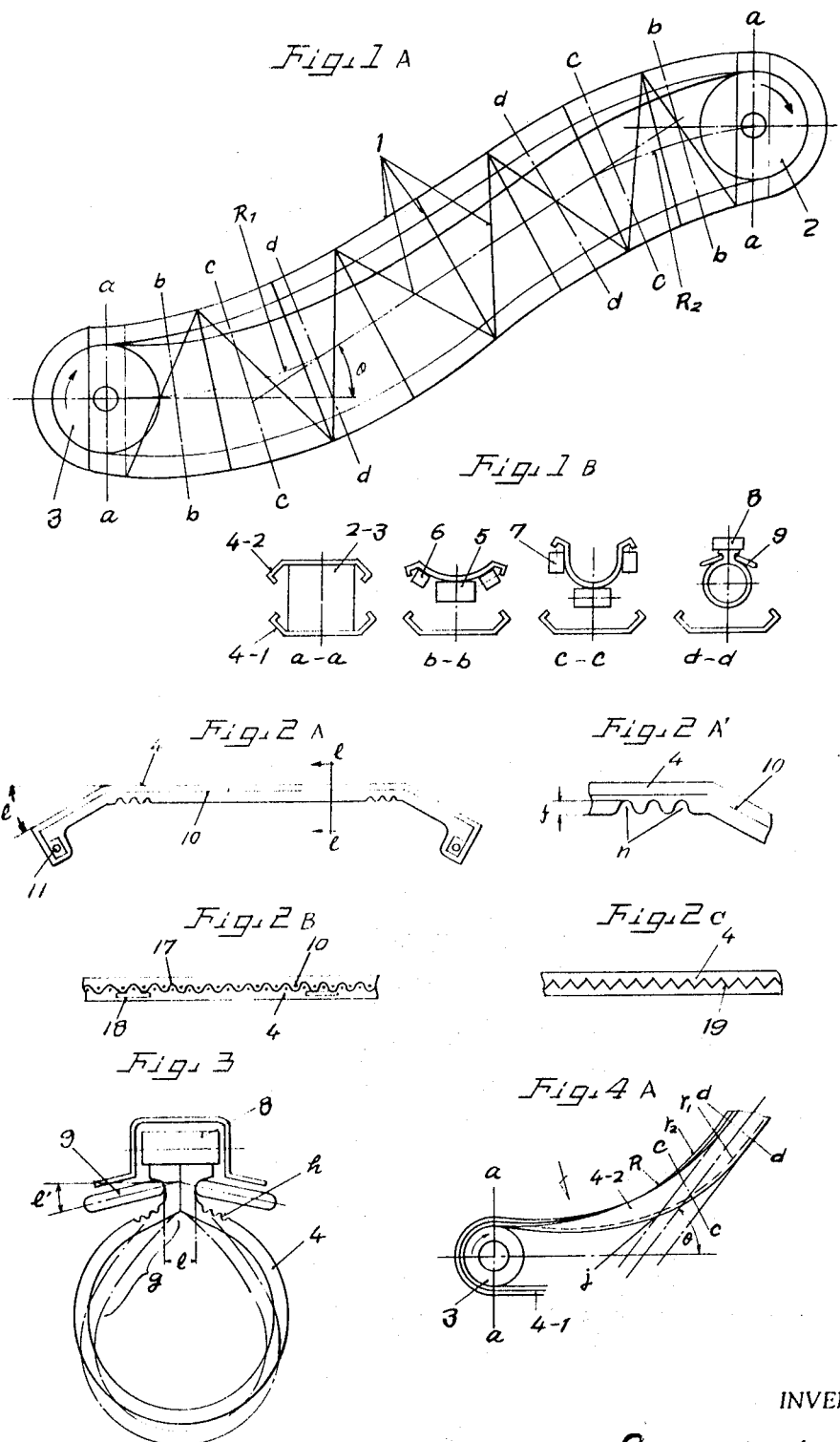

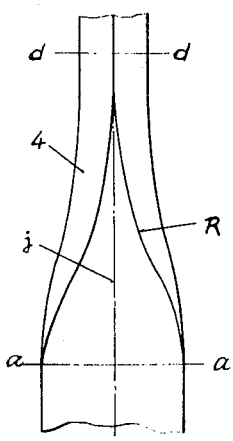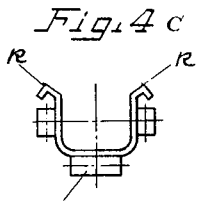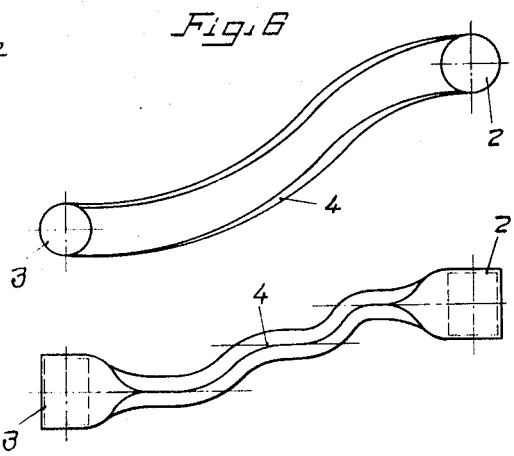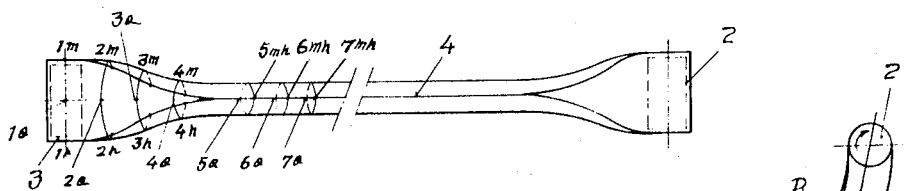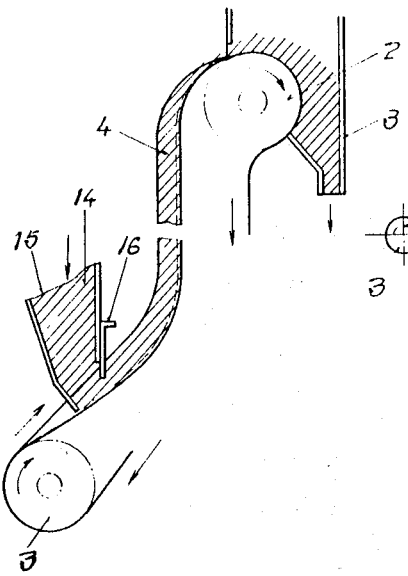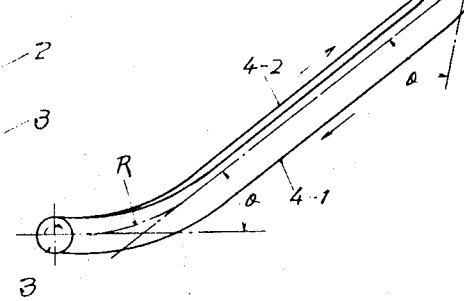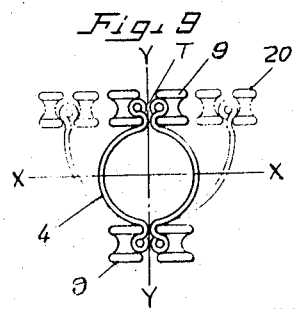

INVENTOR,
Masaaki Koyama
By, Wadsworth, Linde Ponack
Attorneys

AUTOMATIC CIRCULAR WINDING AND RELEASING BELT CONVEYOR

This invention pertains to a belt conveyor or the like to carry an object to be forwarded on the belt surface by means of a mechanically operated pulley provided with an electric motor as a motive power.

To start with, in the prior art techniques relating to this kind of device, friction resistance and structural studies are so advanced that most problems have been eliminated, so these devices are now very widely utilized. However, detour conveyance by these prior art plane conveyors can be performed only by assembling different conveyors.

Moreover, because of the original shape of the belt, it is impossible to prevent swinging of the object to be carried.

Further, unless the conveyor is enveloped or installed with a roofing above, outdoor conveyance may be exposed to snow or rain.

With these disadvantages in mind, it is an object of this invention to prevent scattering of lightweight powder or grains due to wind at time of their conveyance and at the same time to prevent water leakage due to rain and snow and also to enable a steep slope conveyance as well as an entirely new and progressive plane detour wherein the belt automatically takes the form of a cylinder so as to envelope the object to be carried. For this purpose, a new design is adopted to its construction which is not found in any of the conventional plane-shaped belt conveyor.

The present invention satisfies each of the following desires:
a. In the course of a very short-distance runway, it can perform automatically cylinder shaping and flat development.
b. The object can be forwarded in the tube-shape almost all the conveyance distance.
c. The object being grasped in the tube-shape, it can be forwarded over a steeper slope with up and down inclination without causing load slip than with the conventional device.
d. The tube-shaped conveyor enables not only vertical winding carriage (slope carriage) which cannot be found in the plane conveyor, but also a plane detour conveyance (obstacle detour carriage).
e. The frame structure and belt device being made compact, it can be assembled into a lightweight unit which can be utilized as a portable device.
f. Owing to its special hanging structure, high-speed operation can be performed and zigzag running is eliminated.
g. The elastic limit of the belt is fully stressed, whereby deficiency in folding is eliminated in connection with the section of the belt structure.
h. No moisture, soiling or sprinkling whatsoever can be found during conveyance of the object to be carried.

As explained above, this conveyor is a newly designed form of the conventional one which may be easily installed and wherein a plane-shaped belt is automatically made cylindrical to envelop the object before sending it forth. It is widely demanded in the Food Industry, Fertilizer Industry or Chemical Industry as an economical and effective means of conveyance.

The embodiments of this invention will be described in detail with reference to the attached drawings in which:

FIG. 1-A shows a fundamental structure of this invention.

FIG. 1-B illustrate sectional views of the formation of the cylindrical shape of the belt.

FIGS. 2-A, A', B and C show the structure and shape of the belt which is the main conveyor body enveloping the object to be carried.

FIG. 3 is a detailed drawing of the belt and the clamp at the time the cylinder is formed and is an enlarged drawing of the section along line $d$–$c$ in FIG. 1A.

FIGS. 4A, B and C illustrate details of the automatic shaping of the belt.

FIG. 5 shows the deviation from the normal position in driving with respect to each cross section of this device when it is made linear shaped.

FIG. 6 is a drawing explaining the shape enabling conveyance of vertical plane winding and plane detour winding, where cylinder shaping is performed in both the back and forth motions of the conveyor.

FIG. 7 shows a fundamental and theoretical principle of the present invention.

FIG. 8 is a practical embodiment of this invention.

FIG. 9 to 11 are improvements or applications of the fundamental system of this invention.

Figure 10:
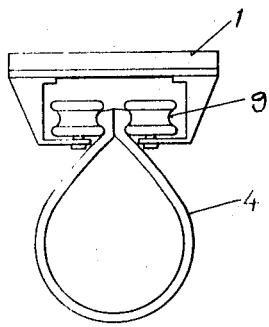

Referring to the drawings, the object to be carried is placed on the belt in the area of lug-roller 6 and clamp roller 7, symmetrically arranged inside the frame 1. The belt section is shaped into cylinder form by the action of pick-up roller 9 and push roller 8 while being sent forward in a hanging state and at the terminal point, the belt is gradually and automatically opened flat in the reverse order, releasing the object to be carried to the outside.

Guide rollers 5 and push roller 8 are used to guide the belt bottom and the upper end of cylinder in case of steep conveyance at an inclination of angle 0 as will be explained later. All of these rollers are installed in the structure part of frame 1.

Pulley 2 at the carrier terminal is a motive power pulley enclosing a motor inside and acts as a motive source. Pulley 3 is a tail pulley and is a guide wheel of the body. It goes without saying that in case of downward conveyance, 2 and 3 may be reversed. It is also possible to get inversion by reversing the rotation direction. 4 is an endless belt which is the main part of this invention.

$a$–$a$, $b$–$b$, $c$–$c$ and $d$–$d$ in FIG. 1-B illustrate the shapes of the belt during assembling; they show in succession automatic winding formation and opening process at the inlet and outlet. 4–1 shows a return part of a plane belt from power the pulley, 4–2 shows the belt prior to being wound up by table pulley 3 until it is shaped into a cylinder form. This part of conveyor belt 4–2 becomes tube-shaped through $a$, $b$–$b$, $c$–$c$ and $d$–$d$.

Moreover, based on the aforementioned principle, as the belt 4 is subject to a strong external force, the belt used for this invention is of a special construction as shown in FIG. 2. This special belt is made of sailcloth canvas coated with india-rubber or plastic and filled with a network structure woven with metal and/or synthetic fibers. The belt in this device is made of any material, but essentially, it is required to be tube-like in the hanging state, the section of which is preferably circular so that the weight on the weft is as even as possible.

It is possible to enforce the belt by providing many layers of sailcloth and increasing the number of push rollers and pick-up rollers, but this is expensive. Also, because of the increase in folding resistance, the folding property which is the feature of this invention is lost.

In FIG. 2-A, 10 is a weft of the padding which is spread in about the center of the belt depth. 11 is a collar of warp metal or synthetic textile endlessly filled in the belt collar. 4 is an endless rubber covering enveloping said padding and collar. FIG. 2-B and C show sections of FIG. 2-A by $e$–$e$ line. 17 is also a padding warp which is extensively woven along the lengthwise extension and gives toughness to the lengthwise direction of the belt. In FIG. 2-C, sailcloth 19 replaces 17. At the time of shaping the rubber belt 4, sailcloth 19 is given lateral plies enabling a lengthwise extension and aiding circular shape formation so that the belt has a stronger resistance for deformation from a circular cross section. Further, 18 is a true circular shape holder which is buried at suitable intervals within the belt when deformation power is great. As described above, in this invention, owing to the action of warp 11 of the collar and a true circular shape holder, weight on the weft is evenly distributed and also owing to lateral plies of sailcloth 19 and elasticity of holder 18, the true circular shape holding of the belt in tube-like hanging state is usefully effected. Moreover, wave-like convex part $h$ as shown in FIG. 2-A' is adopted to accentuate reaction due to toughness of the flat part of the belt so as to make formation of a cylinder easy. The wave depth $f$ and wave number may be increased or decreased according to variations of width and depth in connection with the size and dimension of the belt to be used for the conveyor, to help the collar after cylinder formation of the flat part.

Moreover, the object of this wave-like convex $h$ is, as shown in FIG. 3, to eliminate the increase in resistance at the time of the cylinder circumference's folding in vertical direction when said cylinder circumference presents a linear shape $g$ owing to hanging of the cylinder part.

The neck is shaped at an angle $e$ in order to perform an efficient and true circular formation exactly and usefully at the time of contact of each of the collars. The necessary size of angle $e$ is suitably determined by experimental means.

Now, as shown in FIG. 3, by securing pick-up roller 9 at angle $e'$, it is possible to tighten completely the opening tendency of the clamp part. This purpose is fully attained since pick-up roller 9's contact dimension $l$ can be reduced by utilizing the hanging action due to the weight of the object to be carried, not to speak of the tare of the belt. Moreover, the action of the clamp roller 8 and relief of the collars at time of a slope conveyance at an angle of $\theta$ as shown in FIG. 4 and a plane detour winding further tightens the clamp. At the same time zigzag motion at high-speed operation is prevented by the push up power of the roller.

FIG. 4 and FIG. 5 illustrate the automatic cylinder formation. The belt 4–2 is lifted from tail pulley 3 while going from $a$ to $d$. However, practically, as shown in FIG. 4-B, the running length of point $j$ on the center line of the belt and that of point R at the edge of the belt are greatly different. This difference of length is due to the difference of external force exercised on each part of the belt section. Taking an example in FIG. 1, the external force is the biggest when the contact point of the collar is on the outside of folding circular part as in the case with conveyor belt 4–2 closed to motive power pulley 2 and $R_2$ (winding of the object release part) should be bigger as far as possible than $R_1$ (winding of the inlet part).

Moreover, as it is necessary to close as far as possible the running lengths of points R and $j$ caused by the difference of $r_1$ (outer side winding) and $r_2$ (inner side winding), angle $\theta$ should be properly selected. However, permissible value is added at the time of selection of angle $\theta$.

As in FIG. 5, when pulleys 2 and 3 are on a straight line in a vertical plane, it is shown by the variation of the position of points $m$.Q.P. and in the middle point of the pulley 2 and 3, $m$.Q.P. are arranged again on a straight line, hereafter they make another deviation due to difference of tensile force and finally come to head-pulley 2 passing through the reverse process. Consequently, even in case of the winding process of FIG. 4, by selecting suitably $R_1$ and $R_2$ it is possible to absorb tensile force by arranging for equal running distance of points $j$ and R. That is, it is most desirable to take the shape as in FIG. 7 by adding the aforementioned elements.

Practically, in this invention, the belt is necessary to make it closer to plane-like shape, the closer it is to the upper pulley. Therefore, $R_1$ and $R_2$ are so selected that they can be included within the permissible tensile force of the endless belt in connection with the above-mentioned feature of the belt.

To conclude the above explanation, an embodiment of this invention will be shown in FIG. 8. Endless belt 4 of this device will be carried by motive power pulley 2 and through tail pulley 3, the object to be sent 14 will be accepted at hopper 15 at the beginning of cylinder formation and be loaded suitably by means of feed regulation lid 16 and there immediately formed into a tube-shape and then sent forth safely and quickly up to the height to reach chute 13 where it is flat-opened and finally released.

The undermentioned four items relate to running induction or clamp processes associated with this invention which are used conjointly to render smoother the function of the belt conveyor. To explain each of these processes one by one:

Belt 4 shown in FIG. 9 is a long-size rubber already made into endless tube shape, and divided into two parts. It is made of an endless belt, the terminal T thereof if formed as shown in the drawing.

Pick-up roller 9 and guide roller 20 are secured to the frame to guide belt 4. The release and return of the upper part of belt are forcibly performed while going from pick-up roller 9 to guide roller 20, and the object to be sent is released when the lower part of outlet is opened. As a matter of fact, when this induction means is adopted, inversion of the belt is performed in a cylindrical state, as is shown in FIG. 9 around its axis Y—Y. That is, the belt will be flat released contrary to the above-mentioned process in which inversion is performed in a different way.

FIG. 10 shows one of the induction methods for the automatic winding and releasing belt conveyor wherein pick-up roller 9 is provided with a groove.

Figure 11:
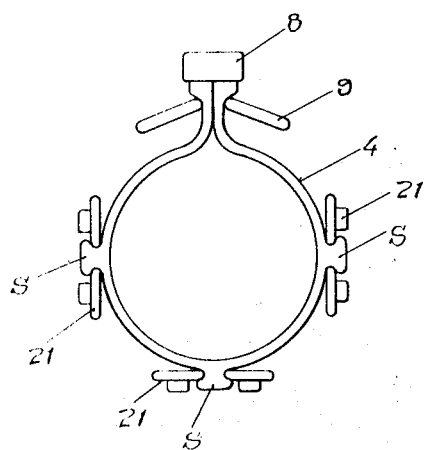

FIG. 11 is a variation of the belt section of automatic circular winding and releasing belt conveyor. S is protruded from the belt as shown in the drawing and forcedly guided by guide roller 21 to help maintaining a true circle. To adopt this means, it was proved to be most desirable that the structure of belt padding be made as in FIGS. 2-B and C.

What is claimed is:

1. An endless belt conveyor comprising a frame having a motive pulley and a tail pulley at opposite ends thereof; a belt positioned to run over both of said pulleys, said belt comprising a flat plane section, a pair of collar sections extending at an angle from the plane of said flat section, endless reinforcing warps extending lengthwise through said collar sections, a weft padding positioned transversely within said flat section, an endless warp padding extending lengthwise within said flat section, and a plurality of circular shaped holders buried transversely within said flat section, said flat section having endless lengthwise indentations therein at the areas of junction with said collar sections; a plurality of pick-up rollers mounted on said frame to contact said collar sections to form said belt into a cylindrical cross-sectional shape; a plurality of guide rollers positioned on said frame to support said belt while being formed into said cylindrical shape; and a plurality of push rollers positioned on said frame to contact and compress said collar sections after said belt is formed into said cylindrical shape.

* * * * *